May 22, 1956 W. J. CRAVEN 2,746,116
SEPARABLE LINK
Filed Jan. 6, 1953

*INVENTOR.*
WILBUR J. CRAVEN
BY
*Lindsey and Prutzman*
ATTORNEYS

United States Patent Office 2,746,116
Patented May 22, 1956

2,746,116
SEPARABLE LINK

Wilbur J. Craven, East Hartford, Conn., assignor to The Capewell Manufacturing Company, Hartford, Conn., a corporation of Connecticut Application January 6, 1953, Serial No. 329,868

4 Claims. (Cl. 24—265)

This invention relates to connecting devices and pertains more particularly to a separable link for connecting together straps, shroud lines, and the like.

One object of the invention is to provide a separable link which is of low cost and light-weight construction yet possessing a high degree of strength and reliability.

More specifically, the invention contemplates the provision of a link having an exceptionally high strength to weight ratio which renders the link particularly attractive for use in making parachute harness connections.

Another object of the invention is to provide a link of the foregoing character which is comprised of only a few parts which may be assembled and disassembled very readily.

A further object of the invention is to provide a link of the above type, the parts of which are not likely to become accidentally separated.

A still further object is to provide a separable link in which excess loading to the point of deformation will not result in separation.

A further object of the invention is to provide a separable link having a vastly improved degree of end strength, that is to say, a high resistance to load applied at right angles to that normally applied.

Yet, another object of the invention is to provide a separable link which is easily threaded through relatively small loops or openings without the utilization of auxiliary equipment.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
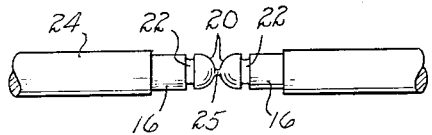
Figure 1 represents one stage of manufacture in making my separable link.
Figure 2:
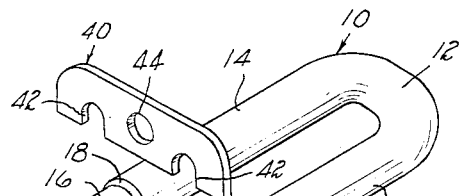
Figure 2 is an exploded perspective view showing the relative position of the various link parts during assembly thereof.

In the embodiment of the invention selected for illustration in the drawing, the separable link is designated in its entirety by the reference numeral 10. The link 10 includes a generally U-shaped member 12 comprising a pair of substantially parallel legs 14 which are provided with reduced end portions forming a pair of posts 16 and respective shoulders 18 which shoulders are employed for a purpose subsequently to be described. The extremities of the post 16 are rounded at 20 to facilitate the insertion of the legs 16 through small-sized loops, or other openings, as will hereinafter be more fully explained, and near each rounded end 20 is disposed a circumferential groove 22.

In fabricating the member 12, a length of rod stock 24 is suitably rotated and during the rotation of the rod stock a cutting tool is brought into engagement therewith. The cutting tool (not shown) is configured to produce the shape shown in Figure 1, and from an inspection of this figure, it will be seen that the cutting tool is designed to produce the posts 16, the shoulders 18, the rounded ends 20, and the circumferential grooves 22. In this way, two ends of different U-shaped members 12 may be cut simultaneously. After the cutting or forming operation has been completed, the neck 25 is severed with a suitable cutting implement, such as a saw or shearing blade, and the opposite ends of each straight section are bent toward each other to form what has been designated the U-shaped member 12. By using rod stock, not only is it possible to facilitate the formation of the reduced end portions 16, but an additional advantage is obtained inasmuch as the grain or fiber flow around the corners of the U-shaped member 12 is very similar to that which would be obtained by drop forging. The member may then be subjected to heat treatment.

The link assemblage 10 further comprises a yoke 26 provided with a pair of spaced throughbores 28 and an intermediate bore 30 having a threaded section 32, an unthreaded counterbore 34 of slightly larger diameter than the threaded section 32, and a countersunk section 35. Also provided in the yoke 26 is a transverse slot 36 which intersects or communicates with each of the three bores designated by the numerals 28 and 30. It should be noted that the slot 36 is disposed relatively close to one face of the yoke 26 in order to produce a relatively thin resilient flange 38, the purpose of which will be described more fully hereinafter.

Another element which comprises a part of the link 10 is a locking plate 40 having a pair of notches 42 spaced in such a manner as to provide marginal or bordering edge portions which are engageable in the grooves 22. Also contained in the locking plate 40 is an aperture 44 which is positioned so as to be in registry with the counterbore 34 for a purpose presently to be explained. Further, the thickness of the locking plate 40 is less than the width of the slot 36, the reason for which will hereinafter be given.

Figure 6:
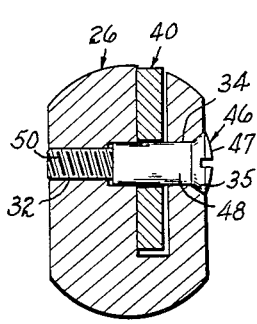
Figure 6 is a slightly exaggerated sectional view taken in the direction of the line 6—6 of Figure 3.

An oval head shoulder screw 46 equipped with a head 47, a shoulder 48 and a threaded shank 50 is designed to have its shoulder snugly received in the counterbore 34 when the screw is threaded into the threaded section 32 of the intermediate bore 30. As previously indicated, the flange 38 is of sufficient thinness to be somewhat resilient and inasmuch as the locking plate 40, as mentioned in the preceding paragraph, is thinner than the width of the slot 36, upon tightening of the screw 46, the head 47 will flex the flange 38 toward the opposite side of the slot. In this way, the threaded shank 50 is maintained under tension due to the deflected condition of said flange 38; this relationship may be best noted from Figure 6.

Figure 3:
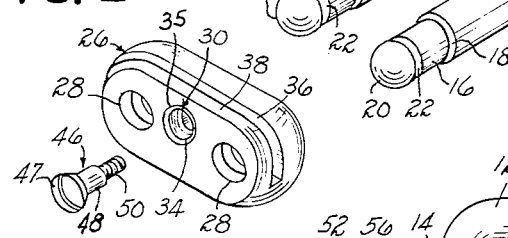
Figure 3 is a plan view showing the link in an assembled condition, the link illustratively connecting the ends of two belts or straps together.
Figure 3:
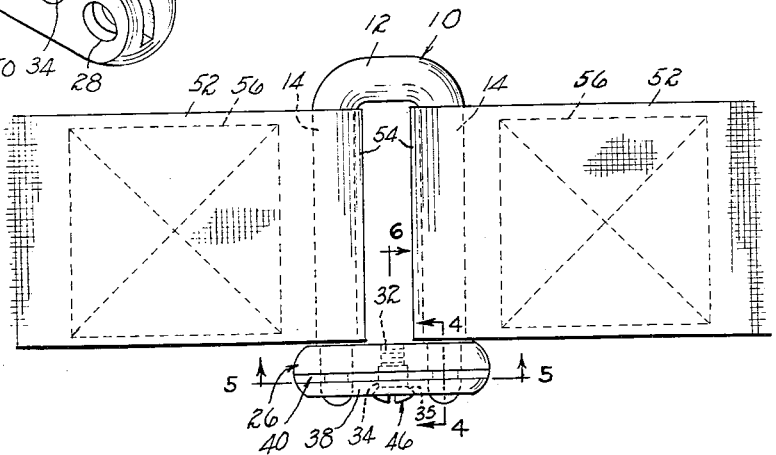

In order to illustrate the general utility of my link 10, there is fragmentarily shown in Figure 3 a pair of straps 52 having loops 54, which are formed by reversely bending portions of such straps about themselves and then stitching the reversely bent portions at 56. At this point, it might be mentioned that the link 10 is suitable for connecting various items together such as belts, shroud lines, harness, and the like. However, because of the ease with which the link can be assembled and disassembled and also due to its great strength and reliability, the link will find especial utility in making parachute harness connections.

Figure 4:
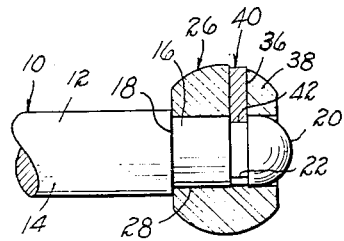
Figure 4 is a sectional detail taken in the direction of line 4—4 of Figure 3.

Describing now the manner in which my link 10 can be assembled to perform the function of connecting together the two straps 52, it will be observed that the rounded ends 20 are readily threaded through the loops 54, this threading action being facilitated by the convex configuration of these ends. In this way, there is no need for any auxiliary equipment which is required in certain prior art link devices to properly thread these prior art links through relatively small-sized loops. After the foregoing threading operation has been carried out, the yoke 26 is inserted over the posts 16, the shoulders 18 serving as abutments against which the yoke is arrestively engaged and when so positioned the slot 36 is then in registry with the grooves 22. As best seen in Figure 4, the alignment of the slot 36 with these grooves 22 permits the ready introduction of the locking plate 40 into the slot, such introduction or insertion being facilitated by virtue of the locking plate being of less thickness than the normal width of said slot, to such an extent that the edges bordering the notches 42 engage in these grooves.

Having positioned the plate 40 in the slot 36, the aperture 44 is in registry with the intermediate bore 30, and therefore the screw 46 may be threaded into place. Since the screw 46 passes through the plate 40, it will be seen that the plate is effectively retained within the slot 36. Full tightening of the screw 46 will cause the resilient flange 38 to flex inwardly toward the locking plate and the flange will thereafter exert sufficient pressure against the underside of the head of the screw 46 to cause the threads of the shank 50 to bear tightly against the threads of the section 32 and thus prevent accidental dislodgement of said screw.

Figure 5:
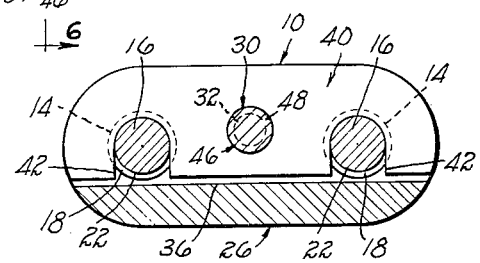
Figure 5 is a sectional view taken in the direction of line 5—5 of Figure 3.

Inasmuch as the notches 42 extend inwardly from one edge of the locking plate 40 with the screw 46 in place, there is no possibility of the plate 40 becoming disengaged from the slot, for any tendency to pivot about the screw 46 will be resisted by the two legs 14. Further as will be seen from Figure 5, there is a slight clearance between the lower edge of the locking plate 40 and the base of the slot 38. In this way, the marginal edges of the notches 42 will be permitted to contact the base of each circumferential groove 22 and the full depth of each groove is therefore fully utilized in preventing any axial or endwise movement of the yoke relative to the posts 16, thereby preventing detachment of the yoke from these posts.

One feature not readily appreciated from the above description is that a secondary strength factor will be brought into play should the legs 14 become distorted through the application of excessive loads to the straps 52 or whatever elements the link 10 is serving to connect together. This secondary strength factor produces a locking or wedging of the posts 16 more firmly within the bores 28 of the yoke 26, and while this would eliminate or appreciably reduce the desired feature of separability which is intended in the link, nevertheless, it does promote security against any possible premature release of a load borne by the link. By reason of this feature, the link is particularly suited for parachute connections where disengagement of the link must be precluded at all costs. Of course, when the link 10 is subjected to only normal loads, which normal loads can be the shock loads experienced in parachute drops, no mechanical deformation will take place and the link is readily separated whenever the screw 46 and the locking plate 40 are removed. However, should an emergency exist through the application of excessively severe loads as above mentioned, then the posts will be firmly wedged within the bores 28 to even more positively insure against undesired separation of the various elements constituting the link 10. Another feature which has been mentioned and which feature renders the instant link particularly attractive for parachute operations is the fact that the resilient flange 38 exerts a force against the head of the screw 46, thereby exercising a tension on said screw to keep it from accidentally vibrating loose. Also the rounded ends 20 facilitate the threading of the legs 14 through the various loops and shroud lines normally encountered on parachute harnesses.

Therefore, particularly due to the specifically enumerated above advantages, it is believed obvious that my separable link will find especial utility in parachute operations, although as hereinbefore indicated the link is susceptible to general use, it being in no way restricted to any particular application.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A separable link comprising a U-shaped member including a pair of leg portions each provided with a groove extending at least partially therearound, a yoke member having a pair of spaced apertures into which said leg portions are adapted to extend, a third aperture disposed intermediate said pair of apertures and a transverse slot communicating with the three apertures, a locking plate receivable in said slot provided on one side with a pair of notches forming bordering edge portions slidably engageable in said grooves and having an aperture registrable with said third aperture, and removable fastening means engageable in said third aperture and adapted to extend through said locking plate aperture to prevent disengagement of said notches from said grooves.

2. A separable link comprising a U-shaped member including a pair of legs having reduced end portions each provided with a circumferential groove, a yoke member having a pair of spaced apertures extending therethrough for the accommodation of said end portions, a threaded aperture intermediate said pair of apertures and a transverse slot communicating with the three apertures, a locking plate receivable in said slot provided with a pair of notches forming bordering edge portions engageable in said grooves and having an aperture registrable with said threaded aperture, and a threaded member engageable with said threaded aperture and adapted to extend through said locking plate aperture to retain said locking plate in said slot.

3. A separable link in accordance with claim 2 in which said end portions are equipped with rounded extremities.

4. A separable link comprising a U-shaped member including a pair of leg portions each provided with a groove extending at least partially therearound, a yoke member having a pair of spaced apertures into which said leg portions are adapted to extend, a third aperture intermediate said pair of apertures and a transverse slot communicating with said three apertures and disposed sufficiently close to one face of said yoke to form a resilient flange, a section of said third aperture intermediate said slot and the face of said yoke lying opposite said one face being threaded, a locking plate of less thickness than the width of said slot normally to fit loosely therein and having an aperture registrable with said third aperture, and a screw extending through the unthreaded section of said third aperture into engagement with said threaded section, said screw passing through said locking plate aperture, whereby tightening of said screw will cause said resilient flange to be flexed inwardly against said plate to retain said screw in place.

References Cited in the file of this patent

UNITED STATES PATENTS

| 309,310 | Neale | Dec. 16, 1884 |
| 1,232,731 | Stone | July 10, 1917 |

FOREIGN PATENTS

| 4,428 | Great Britain | Feb. 23, 1904 |